(12) United States Patent
De Bruycker et al.

(10) Patent No.: US 11,289,708 B2
(45) Date of Patent: Mar. 29, 2022

(54) GAS DIFFUSION LAYER

(71) Applicant: NV Bekaert SA, Zwevegem (BE)

(72) Inventors: Ruben De Bruycker, Zwijnaarde (BE); Davy Goossens, Kluisbergen (BE); Kris Synhaeve, Kuurne (BE); Jeremie De Baerdemaeker, Anzegem (BE)

(73) Assignee: NV BEKAERT SA, Zwevegem (BE)

(*) Notice: Subject to any disclaimer, the term of this patent is extended or adjusted under 35 U.S.C. 154(b) by 299 days.

(21) Appl. No.: 16/482,376

(22) PCT Filed: Apr. 4, 2018

(86) PCT No.: PCT/EP2018/058572
§ 371 (c)(1),
(2) Date: Jul. 31, 2019

(87) PCT Pub. No.: WO2018/189005
PCT Pub. Date: Oct. 18, 2018

(65) Prior Publication Data
US 2020/0006782 A1    Jan. 2, 2020

(30) Foreign Application Priority Data

Apr. 13, 2017    (EP) .................................. 17166552.4

(51) Int. Cl.
*H01M 4/86*    (2006.01)
*H01M 4/88*    (2006.01)

(52) U.S. Cl.
CPC ......... *H01M 4/8807* (2013.01); *H01M 4/861* (2013.01); *H01M 4/8621* (2013.01); *H01M 4/8631* (2013.01); *H01M 2004/8694* (2013.01)

(58) Field of Classification Search
None
See application file for complete search history.

(56) References Cited

U.S. PATENT DOCUMENTS

| 4,640,156 A | 2/1987 | Nakagawa et al. |
| 4,930,199 A | 6/1990 | Yanagisawa |

(Continued)

FOREIGN PATENT DOCUMENTS

| WO | 03/059556 | 7/2003 |
| WO | 2014/048738 | 4/2014 |

OTHER PUBLICATIONS

International Search Report dated Aug. 8, 2018 in International Application No. PCT/EP2018/058572.

(Continued)

*Primary Examiner* — Tracy M Dove
(74) *Attorney, Agent, or Firm* — Wenderoth, Lind & Ponack, L.L.P.

(57) ABSTRACT

A gas diffusion layer for an electrolyser or for a fuel cell comprises a first nonwoven layer of metal fibers provided for contacting a proton exchange membrane, a second nonwoven layer of metal fibers, and a third porous metal layer. The first nonwoven layer of metal fibers comprises metal fibers of a first equivalent diameter. The second nonwoven layer of metal fibers comprises metal fibers of a second equivalent diameter. The second equivalent diameter is larger than the first equivalent diameter. The third porous metal layer comprises open pores. The open pores of the third porous metal layer are larger than the open pores of the second nonwoven layer of metal fibers. The second nonwoven layer is provided in between and contacting the first nonwoven layer and the third porous metal layer. The second nonwoven layer is metallurgically bonded to the first nonwoven layer and to the third porous metal layer. The thickness of the third porous metal layer is at least two times—and preferably at least three times—the thickness of the first nonwoven layer.

14 Claims, 2 Drawing Sheets

(56) References Cited

U.S. PATENT DOCUMENTS

| | | | |
|---|---|---|---|
| 6,010,606 A | | 1/2000 | Denton et al. |
| 2015/0064606 A1 | | 3/2015 | Dekempeneer et al. |
| 2016/0049677 A1 | | 2/2016 | Müller |

OTHER PUBLICATIONS

Written Opinion of the International Searching Authority dated Aug. 8, 2018 in International Application No. PCT/EP2018/058572.
Park et al., "A review of gas diffusion layer in PEM fuel cells: Materials and designs", International Journal of Hydrogen Energy, vol. 37, No. 7, Apr. 1, 2012, pp. 5850-5865, XP055372450.

GAS DIFFUSION LAYER

TECHNICAL FIELD

The invention relates to the field of gas diffusion layers as are e.g. used in electrolysers and fuel cells.

BACKGROUND ART

WO03/059556A2 discloses a stack for use in a fuel cell or in an electrolyser. The stack comprises an impermeable metal structure, a first metal fiber layer and a second metal fiber layer. The impermeable metal structure is sintered to one side of the first metal fibers layer and the second metal fibers layer is sintered to the other side of the first metal fibers layer. The second metal fiber layer is provided as contact layer to a PEM (proton exchange membrane) in a fuel cell or in an electrolyser. The planar air permeability of the stack is more than 0.02 l/min*cm.

DISCLOSURE OF INVENTION

The first aspect of the invention is a gas diffusion layer for an electrolyser or for a fuel cell. The gas diffusion layer comprises a first nonwoven layer of metal fibers provided for contacting a proton exchange membrane (which could be coated with a catalyst), a second nonwoven layer of metal fibers, and a third porous metal layer. The first nonwoven layer of metal fibers comprises metal fibers of a first equivalent diameter. The second nonwoven layer of metal fibers comprises metal fibers of a second equivalent diameter. The second equivalent diameter is larger than the first equivalent diameter. The third porous metal layer comprises open pores. The open pores of the third porous metal layer are larger than the open pores of the second nonwoven layer of metal fibers. The second nonwoven layer is provided in between and contacting the first nonwoven layer and the third porous metal layer. The second nonwoven layer is metallurgically bonded to the first nonwoven layer and to the third porous metal layer. The thickness of the third porous metal layer is at least two times—and preferably at least three times, more preferably at least five times—the thickness of the first nonwoven layer.

The first nonwoven layer is provided to act as contact layer to a proton exchange membrane (PEM). The use of the fine fibers is beneficial, as a large contact area with the PEM is provided for the electrochemical reaction to take place; and the fine pores—present because of the use of the fine fibers in the first nonwoven layer—allow capillarity for efficient mass transport to and from the reaction sites at the PEM. The third porous layer has bigger pores than the first nonwoven layer; the positive consequence is an efficient planar mass inflow and outflow. The planar flow is further improved thanks to the thickness of the third porous layer, thereby providing a large cross section for planar mass flow.

Although the presence of the second nonwoven layer of metal fibers negatively affects the inflow and outflow of molecules through the plane—and consequently negatively affects the functionality of the electrolyser or fuel cell as the reduced flow increase the required overvoltage of the electrolyser—, the use of the intermediate second nonwoven layer of metal fibers provides particular benefits. Metallurgical bonding of the first nonwoven layer directly onto the third porous metal layer has been noticed to be very troublesome and not reliable, early failure of the bond is a consequence as well as a higher electrical resistance through the thickness of the gas diffusion layer at the operation pressure.

The metallurgical bonds between the layers are important, as such bonds provide for a low electrical resistance between the layers. Providing the second nonwoven layer in between the first nonwoven layer and the third porous metal layer ensures that a reliable metallurgical bonding between the layers can be provided, as the difference in pore sizes of the layers, and consequently the size of the metallic structures building up the layers, that need to be bonded directly to each other is reduced. The benefit is a reduced ohmic resistance of the gas diffusion layer, reducing the overvoltage of the electrolyser, and an improved mechanical stability of the gas diffusion layer. There is inevitably a certain amount of hairiness on the surface of both nonwovens. Consequently, fibers from the first nonwoven will penetrate to a certain extent in the second nonwoven, and metal fibers of the second nonwoven will penetrate to a certain extent in the first nonwoven and in the third porous layer. The penetrations create enhanced metallic contacts and metallurgical bonding, both beneficial for the reduced ohmic resistance of the gas diffusion layer, reducing the overvoltage of the electrolyser, and an improved mechanical stability of the gas diffusion layer.

With equivalent diameter of a fiber is meant the diameter of a circle having the same surface area as the cross section of a fiber which does not necessarily has a circular cross section.

The pore size of the nonwoven layers or of the third porous metal layer can be observed in several ways. A cross section through the thickness of the gas diffusion layer can be made, and the cross section can be analysed under a microscope, in which the pores—and their sizes—become visible. A more advanced method is X-ray tomography of the gas diffusion layer.

Preferably, the second equivalent diameter is at least 50% larger than the first equivalent diameter.

The second nonwoven layer is metallurgically bonded to the first nonwoven layer and to the third porous metal layer. Metallurgical bonding can e.g. be performed by means of sintering or by means of welding (e.g. by means of capacitive discharge welding, CDW).

Preferably, the metal fibers in the first nonwoven layer are metallurgically bonded to each other.

Preferably, the metal fibers in the second nonwoven layer are metallurgically bonded to each other.

Preferably, the first equivalent diameter is less than 35 µm, preferably less than 25 µm, more preferably less than 20 µm.

Preferably, the second equivalent diameter is between 20 µm and 60 µm.

Preferably, the thickness of the second nonwoven layer is at least double the thickness of the first nonwoven layer.

Preferably, the thickness of the first nonwoven layer is less than 0.15 mm. Such embodiments provide a particularly beneficial gas diffusion layer, as the first nonwoven layer that provides the contact layer with the PEM is thin, such that in the available space for the provision of the gas diffusion layer in the electrolyser, a larger thickness of the third porous layer can be provided; third porous layer that provides for the in-plane inflow and outflow of water and reaction products.

Preferably, the first nonwoven layer and the second nonwoven layer comprise—and preferably consist out of—titanium fibers. The third porous layer comprises—and preferably consists out of—titanium.

In a preferred embodiment, the first nonwoven layer and the second nonwoven layer have the same porosity.

In a preferred embodiment, the metal fibers of the first nonwoven layer have a discrete length; and have a cross section, wherein the cross section has two neighboring straight lined sides with an included angle of less than 90 degrees and one or more irregularly shaped curved sides. The metal fibers of the first nonwoven layer have a large surface area thanks to the irregular shape of their cross section. The consequence is a large surface area in contact with the proton exchange membrane on which the electrochemical reaction can take place, especially when the surface of the first nonwoven layer is coated with catalyst or when the proton exchange membrane is coated with catalyst.

Such fibers can be made as described in WO2014/048738A1. Another technology for producing such fibers is described in U.S. Pat. No. 4,640,156.

In a preferred embodiment, the metal fibers of the second nonwoven layer have a quadrangular, and preferably a rectangular cross section. A technology for manufacturing such fibers is disclosed in U.S. Pat. No. 4,930,199.

Preferably, the metal fibers of the second nonwoven layer have a cross section, wherein the cross section has two neighboring straight lined sides with an included angle of less than 90 degrees and one or more irregularly shaped curved sides. Such fibers can be made as described in WO2014/048738A1. Another technology for producing such fibers is described in U.S. Pat. No. 4,640,156.

In a preferred embodiment, the third porous metal layer comprises or consists out of a third nonwoven layer of metal fibers. The third nonwoven layer of metal fibers comprises metal fibers of a third equivalent diameter. The third equivalent diameter is larger than the second equivalent diameter.

Preferably, the third equivalent diameter is at least 40 µm—and more preferably at least 50 µm—larger than the first equivalent diameter.

Preferably, the metal fibers in the third nonwoven layer are metallurgically bonded to each other.

In a preferred embodiment, the first nonwoven layer, the second nonwoven layer and the third nonwoven layer have the same porosity.

Preferably, the third equivalent diameter is larger than 50 µm, preferably larger than 60 µm, more preferably larger than 70 µm. Such embodiments have the benefit that large pores are provided in the third nonwoven layer, facilitating the in-plane flow through the third porous layer.

Preferably, the metal fibers of the third nonwoven layer have a quadrangular, and preferably a rectangular cross section. A technology for manufacturing such fibers is disclosed in U.S. Pat. No. 4,930,199. Embodiments wherein the metal fibers of the third nonwoven layer have a quadrangular, and preferably a rectangular cross section, have a synergistic benefit: the metal fibers of the third nonwoven layer have a more compact cross section, which does not create obstructions for the planar inflow and outflow of gases in the electrolyser or fuel cell in which the gas diffusion layer is used.

Preferably, the metal fibers of the third nonwoven layer have a discrete length; and have a cross section, wherein the cross section has two neighboring straight lined sides with an included angle of less than 90 degrees and one or more irregularly shaped curved sides. Such fibers can be made as described in WO2014/048738A1. Another technology for producing such fibers is described in U.S. Pat. No. 4,640,156.

In a preferred embodiment, the third porous metal layer comprises or consists out of one or a stack of expanded metal sheets or woven wire meshes. The porosity and pore size of expanded metal sheets and woven wire meshes can be selected separately from the first and the second nonwoven layers. For example, an increased porosity can be selected to reduce pressure drop. It is a benefit that expanded metal sheets have a higher stiffness than sintered nonwovens. A multilayer gas diffusion layer including one or a plurality of expanded metal sheets allows a high surface area at the PEM side while the stiffness prevents sagging when compressed against a profiled surface provided by a bipolar plate in which flow channels have been machined.

Preferably, the third porous metal layer comprises or consists out of a plurality of expanded metal sheets or woven wire meshes; wherein the plurality of expanded metal sheets or woven wire meshes are metallurgically bonded to each other, e.g. by means of sintering or by means of welding, e.g. capacitive discharge welding (CDW).

In a preferred embodiment, the third porous metal layer comprises or consists out of a stack of a plurality of expanded metal sheets. In the stack expanded metal sheets with larger opening size are provided more distant from the second nonwoven layer than expanded metal sheets with smaller opening size.

In a preferred embodiment, the third porous metal layer comprises a first expanded metal sheet and a second expanded metal sheet. The direction of the large dimension of the diamond sized openings of the first expanded metal sheet makes an angle of at least 30°, and preferably of at least 60°, and more preferably of 90°, with the direction of the large dimension of the diamond sized openings of the second expanded metal sheet. Such embodiments provide a better in-plane flow field in the third porous metal layer.

A second aspect of the invention is a stack for an electrolyser or a fuel cell, comprising a gas diffusion layer as in any embodiment of the first aspect of the invention; and a bipolar plate. The bipolar plate contacts the third porous metal layer. Preferably, the bipolar plate is metallurgically bonded to the third porous metal layer, e.g. by means of sintering or welding. Preferably, the bipolar plate is flat over its entire surface that is contacting the third nonwoven layer; meaning that no flow fields are provided in the bipolar plate.

A third aspect of the invention is an assembly of a gas diffusion layer as in any embodiment of the first aspect of the invention and a proton exchange membrane. The first nonwoven layer contacts the proton exchange membrane. Preferably a catalyst is provided on the first nonwoven layer at the side where the first nonwoven layer contacts the proton exchange membrane; or a catalyst is provided on the proton exchange membrane at the side in contact with the first nonwoven layer.

A fourth aspect of the invention is an assembly of a stack as in the second aspect of the invention and a proton exchange membrane. The first nonwoven layer contacts the proton exchange membrane. Preferably a catalyst is provided on the first nonwoven layer at the side where the first nonwoven layer contacts the proton exchange membrane; or a catalyst is provided on the proton exchange membrane at the side in contact with the first nonwoven layer.

MODE(S) FOR CARRYING OUT THE INVENTION

Figure 1:
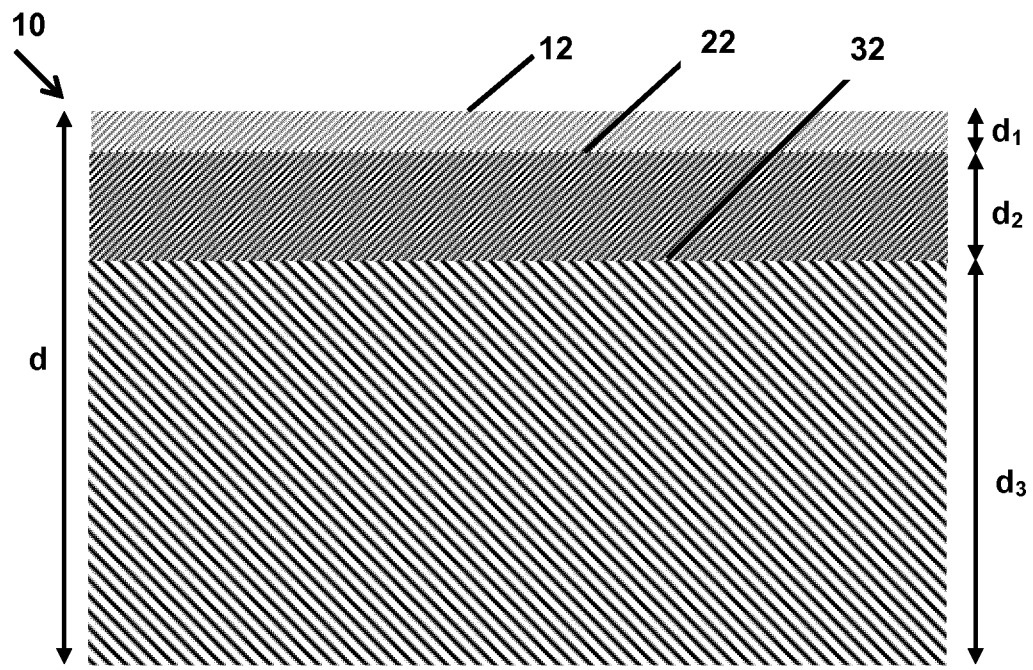
FIG. 1 shows schematically a cross section of a gas diffusion layer according to the invention.
Figure 2:
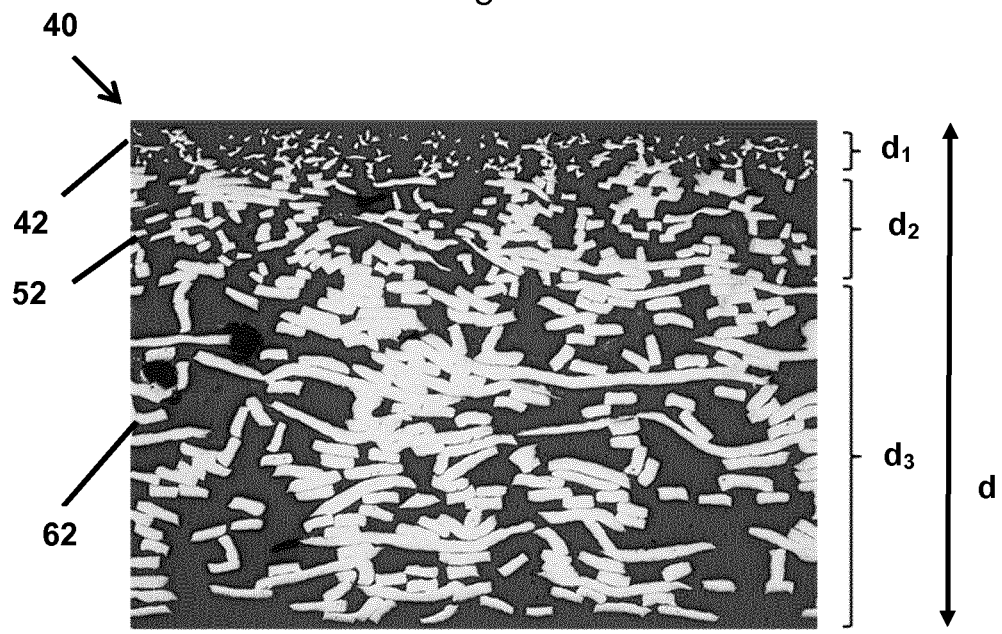
FIG. 2 shows an enlarged picture of a cross section of a gas diffusion layer according to the invention.

A first exemplary gas diffusion layer 10 according to the invention is schematically shown in FIG. 1. A magnified picture of the cross section of this first exemplary gas diffusion layer 40 is shown in FIG. 2. The first exemplary gas diffusion layer 10, 40 consists out of a first nonwoven layer 12, 42 of titanium fibers, a second nonwoven layer 22, 52 of titanium fibers and a third nonwoven layer 32, 62 of titanium fibers. The first nonwoven layer of titanium fibers is provided for contacting a proton exchange membrane in an electrolyser. The first nonwoven layer of titanium fibers comprises titanium fibers of 22 μm equivalent diameter. The titanium fibers of the first nonwoven layer have 14 mm length; and have a cross section, wherein the cross section has two neighbouring straight lined sides with an included angle of less than 90 degrees and one or more irregularly shaped curved sides. The first nonwoven layer has a specific mass of 250 g/m$^2$ and a thickness $d_1$ 0.11 mm.

The second nonwoven layer of titanium fibers consists out of 800 g/m$^2$ of titanium fibers with equivalent diameter 50 μm; the fibers have a quadrangular cross section. The thickness $d_2$ of the second nonwoven layer is 0.35 mm. Because of the larger equivalent diameter of fibers in the second nonwoven layer compared to the first nonwoven layer, the open pores are larger in the second nonwoven layer than in the first nonwoven layer. The third nonwoven layer of titanium fibers consists out of 2600 g/m$^2$ of titanium fibers of equivalent diameter 80 μm. The third nonwoven layer has a thickness $d_3$ 1.14 mm. the open pores in the third nonwoven layer are larger than the open pores in the second nonwoven layer. The titanium fibers of the first nonwoven layer have a discrete length; and have a cross section, wherein the cross section has two neighbouring straight lined sides with an included angle of less than 90 degrees and one or more irregularly shaped curved sides.

The second nonwoven layer is provided in between and contacting the first nonwoven layer and the third nonwoven layer. The second nonwoven layer is sintered to the first nonwoven layer and to the third nonwoven layer. The total thickness d of the gas diffusion layer is 1.6 mm.

The first exemplary gas diffusion layer according to the invention has been compared with a two-layer gas diffusion layer.

The two-layer gas diffusion layer consisted out of a first nonwoven layer of 22 μm equivalent diameter titanium fiber. The first layer had a specific mass of 650 g/m$^2$ and a thickness of 0.28 mm. Sintered to the first nonwoven is another nonwoven of 3000 g/m$^2$ consisting out of 80 μm equivalent diameter titanium fibers and the thickness of the another nonwoven is 1.32 mm; the total thickness of this gas diffusion layer was 1.6 mm; which is the same total thickness as the first exemplary gas diffusion layer according to the invention.

Figure 3:
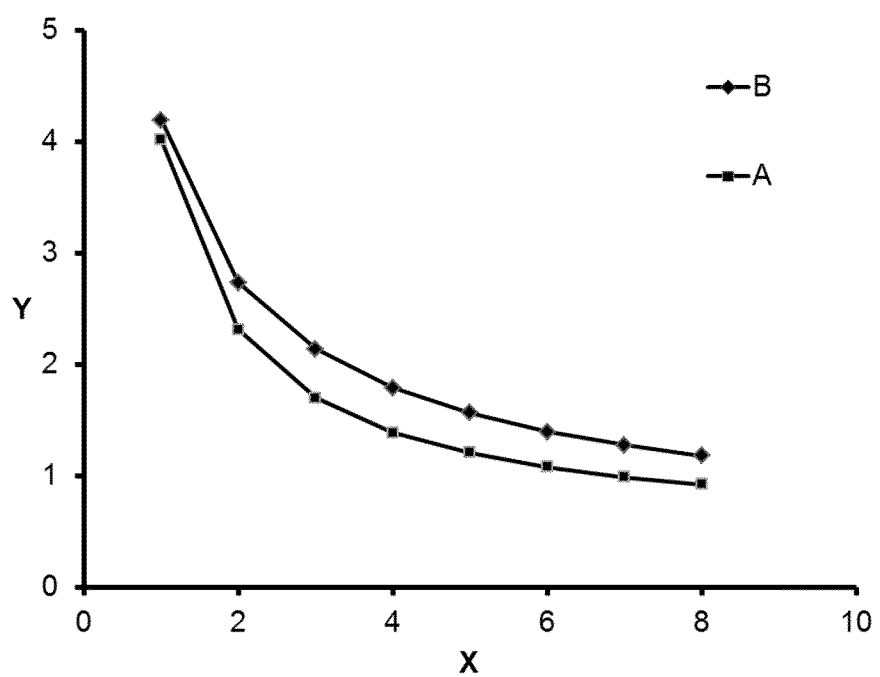
FIG. 3 compares the electrical resistance through the thickness of a gas diffusion layer with a two layer gas diffusion layer.

The electrical resistance has been measured through the thickness of the gas diffusion layer, as a function of the compressive forces on the gas diffusion layer. Gas diffusion layers operate in electrolysers and in fuel cells under compressive forces, e.g. under 4 MPa or even under higher compressive forces. FIG. 3 shows in Y-axis (in mOhm) the measured electrical resistance through the thickness of the inventive gas diffusion layer (curve A) and of the two-layer gas diffusion layer (curve B), as a function of the compressive forces on the gas diffusion layer (in X-axis, compressive forces expressed in MPa). The results show a significantly reduced electrical resistance through the gas diffusion layer under compressive forces (in X-axis, expressed in MPa) as used in an electrolyser or in a fuel cell for the inventive gas diffusion layer (curve A).

A second exemplary gas diffusion layer according to the invention consists out of a first nonwoven layer of titanium fibers, a second nonwoven layer of titanium fibers and a stack of titanium expanded metal sheets. The first nonwoven layer of titanium fibers is provided for contacting a proton exchange membrane in an electrolyser. The first nonwoven layer of titanium fibers comprises titanium fibers of 14 μm equivalent diameter. The titanium fibers of the first nonwoven layer have 10 mm length; and have a cross section, wherein the cross section has two neighbouring straight lined sides with an included angle of less than 90 degrees and one or more irregularly shaped curved sides. The first nonwoven layer has a specific mass of 150 g/m$^2$ and a thickness of 0.15 mm.

The second nonwoven layer of titanium fibers consists out of 150 g/m$^2$ of titanium fibers with equivalent diameter 22 μm. The titanium fibers of the second nonwoven layer have 14 mm length; and have a cross section, wherein the cross section has two neighbouring straight lined sides with an included angle of less than 90 degrees and one or more irregularly shaped curved sides. The thickness of the second nonwoven layer is 0.15 mm. Because of the larger equivalent diameter of fibers in the second nonwoven layer compared to the first nonwoven layer, the open pores are larger in the second nonwoven layer than in the first nonwoven layer. The second nonwoven layer is sintered to the first nonwoven layer.

The third porous layer consists out of a stack of 6 expanded titanium sheets (or meshes), sintered or welded to each other and to the second nonwoven layer. A first mesh 0.125 mm thick with diamond opening size 0.8 mm by 1.2 mm contacts the second nonwoven layer. This first mesh is followed by a second expanded metal sheet identical to the first mesh. Further, the stack comprises two expanded metal sheets of 0.3 mm thickness each and having diamond opening size 1.0 by 2.0 mm; and two expanded metal sheets of 0.68 mm thickness each and having diamond opening size 2.0 by 4.0 mm.

The total thickness of the gas diffusion layer is 2.5 mm.

A third exemplary gas diffusion layer according to the invention consists out of a first nonwoven layer of titanium fibers, a second nonwoven layer of titanium fibers and a stack of titanium expanded metal sheets. The first nonwoven layer of titanium fibers is provided for contacting a proton exchange membrane in an electrolyser. The first nonwoven layer of titanium fibers comprises titanium fibers of 14 μm equivalent diameter. The titanium fibers of the first nonwoven layer have 10 mm length; and have a cross section, wherein the cross section has two neighbouring straight lined sides with an included angle of less than 90 degrees and one or more irregularly shaped curved sides. The first nonwoven layer has a specific mass of 150 g/m$^2$ and a thickness of 0.15 mm.

The second nonwoven layer of titanium fibers consists out of 150 g/m$^2$ of titanium fibers with equivalent diameter 22 μm. The titanium fibers of the second nonwoven layer have 14 mm length; and have a cross section, wherein the cross section has two neighbouring straight lined sides with an included angle of less than 90 degrees and one or more irregularly shaped curved sides. The thickness of the second nonwoven layer is 0.15 mm. Because of the larger equivalent diameter of fibers in the second nonwoven layer compared to the first nonwoven layer, the open pores are larger in the second nonwoven layer than in the first nonwoven layer. The second nonwoven layer is sintered to the first nonwoven layer.

The third porous layer consists out of a stack of five expanded titanium sheets (or meshes), sintered or welded to each other and to the second nonwoven layer. A first mesh 0.1 mm thick with diamond opening size 0.8 mm by 1.2 mm contacts the second nonwoven layer. This first mesh is followed by a second expanded metal sheet 0.3 mm thick with diamond opening size 1 mm by 2 mm. Further, the stack comprises three expanded metal sheets of 2 mm thickness each and having diamond opening size 7 by 14 mm.

The total thickness of the gas diffusion layer is 6 mm.

The invention claimed is:

1. A gas diffusion layer for an electrolyser or for a fuel cell comprising
    a first nonwoven layer of metal fibers provided for contacting a proton exchange membrane, wherein the first nonwoven layer of metal fibers comprises metal fibers of a first equivalent diameter,
    a second nonwoven layer of metal fibers, wherein the second nonwoven layer of metal fibers comprises metal fibers of a second equivalent diameter,
    wherein the second equivalent diameter is larger than the first equivalent diameter, and
    a third porous metal layer, wherein the third porous metal layer comprises open pores
    wherein the open pores of the third porous metal layer are larger than open pores of the second nonwoven layer of metal fibers
    wherein the second nonwoven layer is provided in between and contacting the first nonwoven layer and the third porous metal layer
    wherein the second nonwoven layer is metallurgically bonded to the first nonwoven layer and to the third porous metal layer,
    wherein the thickness of the third porous metal layer has a thickness that is at least two times a thickness of the first nonwoven layer, and
    wherein the first equivalent diameter is less than 35 µm.

2. The gas diffusion layer according to claim 1, wherein the second nonwoven layer has a thickness that is at least double the thickness of the first nonwoven layer.

3. The gas diffusion layer according to claim 1, wherein the thickness of the first nonwoven layer is less than 0.15 mm.

4. The gas diffusion layer according to claim 1,
    wherein the first nonwoven layer and the second nonwoven layer comprise titanium fibers, and
    wherein the third porous metal layer comprises titanium.

5. The gas diffusion layer according to claim 1,
    wherein the metal fibers of the first nonwoven layer have a predetermined length, and
    wherein a cross section of the metal fibers has two neighbouring straight lined sides with an included angle of less than 90 degrees and one or more irregularly shaped curved sides.

6. The gas diffusion layer according to claim 1,
    wherein the third porous metal layer comprises a third nonwoven layer of metal fibers,
    wherein the third nonwoven layer of metal fibers comprises metal fibers of a third equivalent diameter, and
    wherein the third equivalent diameter is larger than the second equivalent diameter.

7. The gas diffusion layer according to claim 6, wherein the first nonwoven layer, the second nonwoven layer and the third nonwoven layer have the same porosity.

8. The gas diffusion layer according to claim 6, wherein the third equivalent diameter is larger than 50 µm.

9. The gas diffusion layer according to claim 6,
    wherein the metal fibers of the third nonwoven layer have a predetermined length, and
    wherein a cross section of the metal fibers has two neighboring straight lined sides with an included angle of less than 90 degrees and one or more irregularly shaped curved sides.

10. The gas diffusion layer according to claim 6, wherein the metal fibers of the third nonwoven layer have a quadrangular cross section.

11. The diffusion layer according to claim 3, wherein the third porous metal layer comprises one or a stack of expanded metal sheets or woven wire meshes.

12. The gas diffusion layer according to claim 11,
    wherein the third porous metal layer comprises a first expanded metal sheet and a second expanded metal sheet, and
    wherein a direction of a large dimension of diamond sized openings of the first expanded metal sheet makes an angle of at least 30° with a direction of a large dimension of diamond sized openings of the second expanded metal sheet.

13. A stack for an electrolyser or a fuel cell, comprising the gas diffusion layer according to claim 1, and
    a bipolar plate,
    wherein the bipolar plate contacts the third porous metal layer.

14. An assembly comprising the gas diffusion layer according to claim 1 and a proton exchange membrane, wherein the first nonwoven layer contacts the proton exchange membrane.

* * * * *